United States Patent
Lindner et al.

(10) Patent No.: US 11,502,917 B1
(45) Date of Patent: Nov. 15, 2022

(54) VIRTUAL REPRESENTATION OF USER-SPECIFIC RESOURCES AND INTERACTIONS WITHIN CLOUD-BASED SYSTEMS

(71) Applicant: Virtustream IP Holding Company LLC, Bethesda, MD (US)

(72) Inventors: Maik A. Lindner, Marietta, GA (US); Eloy F. Macha, Las Cruces, NM (US); Sean C. O'Brien, Atlanta (GA)

(73) Assignee: Virtustream IP Holding Company LLC, Bethesda, MD (US)

( * ) Notice: Subject to any disclaimer, the term of this patent is extended or adjusted under 35 U.S.C. 154(b) by 756 days.

(21) Appl. No.: 15/668,220

(22) Filed: Aug. 3, 2017

(51) Int. Cl.
*H04L 41/22* (2022.01)
*H04L 41/5051* (2022.01)
*H04L 41/0893* (2022.01)
*H04L 47/78* (2022.01)

(52) U.S. Cl.
CPC .......... *H04L 41/22* (2013.01); *H04L 41/5051* (2013.01); *H04L 41/0893* (2013.01); *H04L 47/78* (2013.01)

(58) Field of Classification Search
CPC ..... H04L 41/22; H04L 41/5041; H04L 47/78; H04L 41/0983; H04L 41/0893; H04L 41/5051; G06F 3/0481; G06F 3/0482; G06F 3/0483
See application file for complete search history.

(56) References Cited

U.S. PATENT DOCUMENTS

| | | | |
|---|---|---|---|
| 7,792,256 B1* | 9/2010 | Arledge | H04L 12/2818 348/143 |
| 7,928,980 B2 | 4/2011 | Graziani et al. | |
| 9,438,495 B2* | 9/2016 | Buys | H04L 43/0817 |
| 9,827,500 B1* | 11/2017 | Baklov | A63F 13/86 |
| 9,935,959 B2* | 4/2018 | Keith | H04L 41/50 |
| 10,262,460 B2* | 4/2019 | Chen | G06T 19/003 |
| 10,496,061 B2* | 12/2019 | Strohmenger | G05B 17/02 |

(Continued)

OTHER PUBLICATIONS

VMware, VMware API and SDK Documentation, https://web.archive.org/web/20170707002920/https://www.vmware.com/support/pubs/sdk_pubs.html, Jul. 7, 2017.

(Continued)

*Primary Examiner* — Michael Roswell
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement virtual resources of at least a first cloud-based system. The processing platform further comprises a user-specific cloud infrastructure identification module configured to determine user-specific cloud infrastructure within the first cloud-based system, a virtual representation generator module configured to generate an interactive three-dimensional visualization of the first cloud-based system based on the user-specific cloud infrastructure, and a virtual representation display module configured to output the interactive three-dimensional visualization of the first cloud-based system via at least one type of interface.

20 Claims, 9 Drawing Sheets

(56) References Cited

U.S. PATENT DOCUMENTS

| | | | | |
|---|---|---|---|---|
| 2010/0313145 | A1* | 12/2010 | Dillenberger | G06Q 10/06 715/757 |
| 2012/0030672 | A1* | 2/2012 | Zygmuntowicz | G06F 8/60 718/1 |
| 2012/0046978 | A1* | 2/2012 | Cartwright | G06Q 10/0631 705/7.11 |
| 2013/0007262 | A1* | 1/2013 | Akatoki | H04L 43/04 709/224 |
| 2013/0080480 | A1* | 3/2013 | Mao | G06F 16/182 707/803 |
| 2013/0300747 | A1* | 11/2013 | Wong | G06T 11/206 345/440.2 |
| 2014/0053074 | A1* | 2/2014 | Kim | G06F 3/0484 715/738 |
| 2014/0164364 | A1* | 6/2014 | Cosgrove | G06F 9/44 707/723 |
| 2014/0189097 | A1* | 7/2014 | Sidi | H04L 43/045 709/224 |
| 2014/0372167 | A1* | 12/2014 | Hillier | G06Q 10/06315 705/7.24 |
| 2015/0035823 | A1* | 2/2015 | Arsan | G06T 11/206 345/419 |
| 2015/0067675 | A1* | 3/2015 | Madani | G06F 9/45558 718/1 |
| 2015/0268058 | A1* | 9/2015 | Samarasekera | G08G 5/0073 701/409 |
| 2015/0341230 | A1* | 11/2015 | Dave | H04L 41/5051 705/7.29 |
| 2016/0037356 | A1* | 2/2016 | Bathula | H04W 16/18 455/446 |
| 2016/0044035 | A1 | 2/2016 | Huang | |
| 2016/0048408 | A1* | 2/2016 | Madhu | G06F 11/2023 718/1 |
| 2016/0104046 | A1* | 4/2016 | Doettling | F16M 11/105 382/103 |
| 2016/0191673 | A1* | 6/2016 | Bohannon | H04L 67/2861 709/213 |
| 2016/0196687 | A1* | 7/2016 | Alpert | G06T 17/05 345/419 |
| 2016/0232277 | A1* | 8/2016 | Zmijewski | G06F 17/5086 |
| 2016/0234186 | A1* | 8/2016 | Leblond | H04L 45/14 |
| 2016/0378524 | A1* | 12/2016 | Gough | G06F 9/45558 718/1 |
| 2017/0005878 | A1* | 1/2017 | Strandzhev | H04L 41/145 |
| 2017/0006322 | A1* | 1/2017 | Dury | A63F 13/49 |
| 2017/0249423 | A1* | 8/2017 | Wang | G06K 9/00214 |
| 2017/0249432 | A1* | 8/2017 | Grantcharov | G16H 30/40 |
| 2018/0341343 | A1* | 11/2018 | Noonan | G06F 3/0354 |

OTHER PUBLICATIONS https://web.archive.org/web/20160308081515/https://www.kernel.org/doc/Documentation/virtual/kvm/api.txt, Mar. 8, 2016.

Linuxnix.Com, VM: Get Hypervisor and Guest Virtual Machine Details? http://www.linuxnix.com/kvm-get-hypervisor-and-guest-virtual-machine-details/, Feb. 28, 2013.

* cited by examiner

*FIG. 4*

```
using 3dEngine;
using 3dEngine.Events;
using System.Collections;

public class ExampleClass : ServerRepresentation
{
   3dEngine.Event m_MyEvent;

void Start()
   {
      if (m_MyEvent == null)
         m_MyEvent = new 3dEngineEvent();

m_MyEvent.AddListener(Ping);
   } void Update()
   {
      if (Input.anyKeyDown && m_MyEvent != null)
      {
         m_MyEvent.Invoke();
      }
   } void Ping()
   {
      Debug.Log("Ping");
   }
}
```

FIG. 5

```
public ServerObject virtualServer;

void Start() {
  for (int i = 0; i < 5; i++) {
    Instantiate(virtualServer);
  }
}
```

FIG. 6

```
using 3dEngine;
using System.Collections;

public class DemoScript : serverCreation { public Light 3dvirtualServer;

void Update () {
    if (Input.hypervisorAPI.memoryUsage ("out of memory")) {
      3dvirtualServer.enabled = !3dvirtualServer.enabled;
      3dvirtualServer.color = box.red;
    }
  }
}
```

US 11,502,917 B1

VIRTUAL REPRESENTATION OF USER-SPECIFIC RESOURCES AND INTERACTIONS WITHIN CLOUD-BASED SYSTEMS

FIELD

The field relates generally to information processing systems, and more particularly to techniques for providing cloud services implemented using virtual resources in information processing systems.

BACKGROUND

Information processing systems increasingly utilize reconfigurable virtual resources to meet changing user needs. For example, cloud computing and storage systems implemented using virtual machines have been widely adopted. Such cloud-based systems include, for example, Amazon Web Services (AWS), Google Cloud Platform (GCP), and Microsoft Azure. Despite the widespread availability of these and numerous other private, public and hybrid cloud offerings, there exists a significant problem in conventional practice in that there is no adequate mechanism available for visualizing, to customers, interaction among components within a cloud infrastructure and the location(s) of issues residing therein.

SUMMARY

Illustrative embodiments of the present invention provide information processing systems configured to generate virtual representations of user-specific resources and interactions within cloud-based systems.

In one embodiment, an apparatus comprises a processing platform that includes a plurality of processing devices each comprising a processor coupled to a memory. The processing platform is configured to implement virtual resources of at least a first cloud-based system. The processing platform further comprises a user-specific cloud infrastructure identification module configured to determine user-specific cloud infrastructure within the first cloud-based system, a virtual representation generator module configured to generate an interactive three-dimensional visualization of the first cloud-based system based on the user-specific cloud infrastructure, and a virtual representation display module configured to output the interactive three-dimensional visualization of the first cloud-based system via at least one type of interface.

Illustrative embodiments can provide significant advantages relative to conventional cloud-based system visualization arrangements. For example, challenges associated with the limitations of two-dimensional and tabular representations of cloud-based systems are overcome through the use of a three-dimensional visualization development framework based on user-specific cloud infrastructure. Such virtual representations of user-specific resources and interactions within cloud-based systems facilitates efficient self-service and managed service triggers and simulations, providing substantial efficiency and performance advantages for users.

These and other illustrative embodiments described herein include, without limitation, methods, apparatus, systems, and computer program products comprising processor-readable storage media.

BRIEF DESCRIPTION OF THE DRAWINGS

FIG. 4 shows example pseudocode for user interaction with a three-dimensional environment in an illustrative embodiment.

FIG. 5 shows example pseudocode for creating a server object in an illustrative embodiment.

FIG. 6 shows example pseudocode for updating a three-dimensional server based on hypervisor application programming interface (API) input in an illustrative embodiment.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
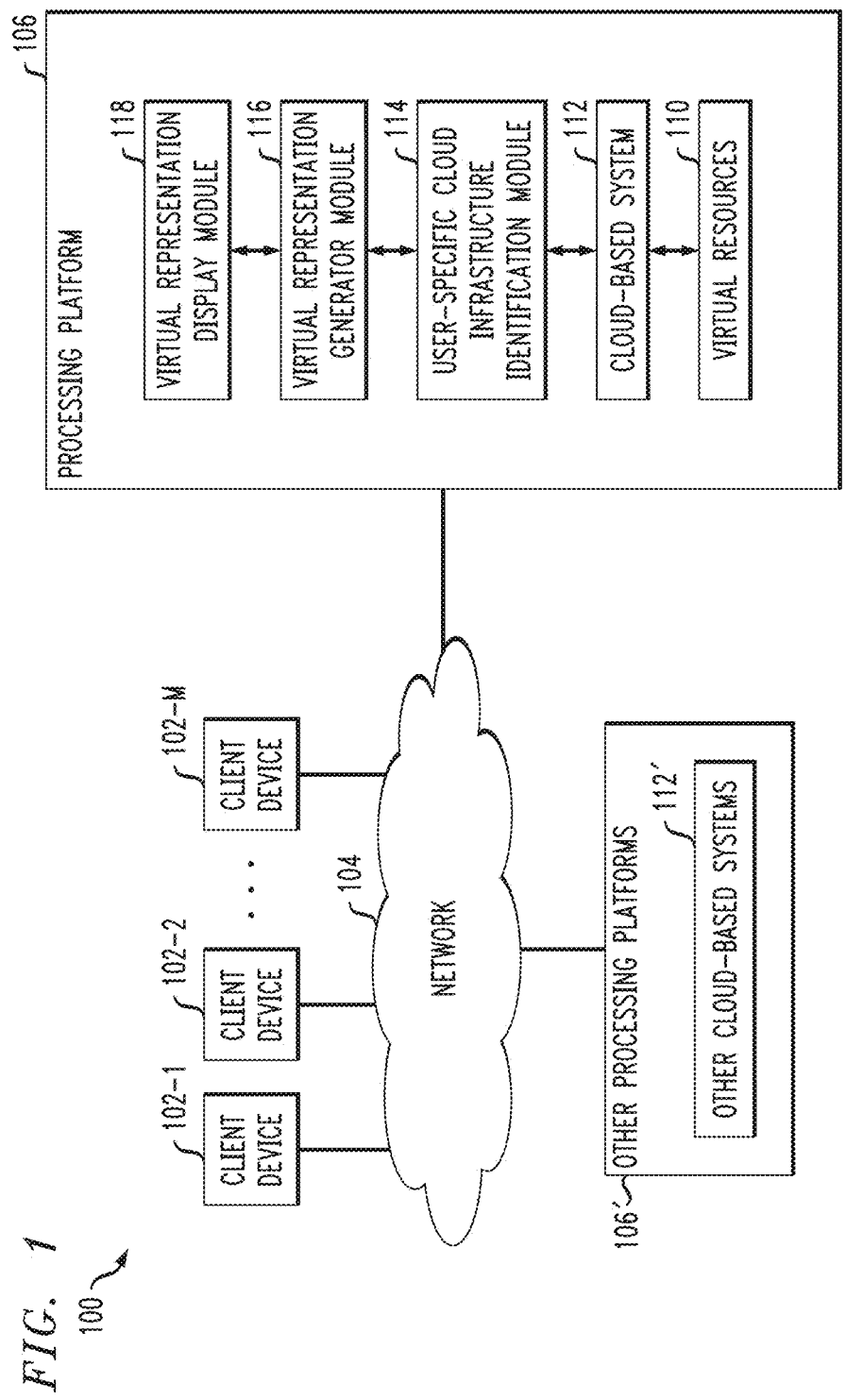
FIG. 1 is a block diagram of an information processing system configured for three-dimensional visualization of a cloud-based system in an illustrative embodiment.

FIG. 1 shows an information processing system 100 configured in accordance with an illustrative embodiment of the present invention. The information processing system 100 comprises a plurality of client devices 102-1, 102-2, . . . 102-M coupled via a network 104 to a processing platform 106.

The client devices 102 in this embodiment can comprise, for example, desktop, laptop or tablet computers, mobile telephones, or other types of processing devices capable of communicating with the processing platform 106 over the network 104. Clients associated with the respective client devices 102 are assumed to run respective sets of client applications utilizing corresponding sets of virtual resources 110 of at least one cloud-based system 112 provided by the processing platform 106. For example, such clients may be respective tenants of a cloud data center or other type of multi-tenant environment provided by the processing platform 106. These tenants or other clients are examples of what are more generally referred to herein as respective "users" of the processing platform 106. Such users are also intended to include customers of a cloud service provider.

In some embodiments, the virtual resources 110 comprise a plurality of containers allocable to respective client applications under the control of the cloud-based system 112. Additional or alternative virtual resources that may be used in a given embodiment include virtual machines. For example, the virtual resources may comprise a plurality of virtual machines allocable to respective ones of the client applications under the control of the cloud-based system 112. Various combinations of containers, virtual machines and other virtual resources may be used in other embodiments. For example, virtual resources may comprise containers running in virtual machines.

The network 104 over which the client devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as Wi-Fi or WiMAX, or various portions or combinations of these and other types of communication networks.

The processing platform 106 is assumed to include a plurality of processing devices each having a processor coupled to a memory, and is configured to implement the virtual resources 110 of the cloud-based system 112 for use by client applications.

The processing platform 106 further comprises a user-specific cloud infrastructure identification module 114, a virtual representation generator module 116 and a virtual representation display module 118, each associated with the cloud-based system 112. The cloud-based system 112 is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private clouds and thus may include various combinations of on-premises and off-premises portions.

The user-specific cloud infrastructure identification module 114 is configured to determine user-specific cloud infrastructure within the first cloud-based system. The virtual representation generator module 116 is configured to generate an interactive three-dimensional visualization of the first cloud-based system based on the user-specific cloud infrastructure. The virtual representation display module 118 is configured to output the interactive three-dimensional visualization of the first cloud-based system via at least one type of interface.

An exemplary process utilizing user-specific cloud infrastructure identification module 114, virtual representation generator module 116, and virtual representation display module 118 of the processing platform 106 in information processing system 100 will be described in more detail with reference to the flow diagram of FIG. 8.

Also, by way of example, in some embodiments, a different cloud-based system comprises another cloud-based system implemented with cloud-based system 112 on the processing platform 106. Alternatively, the different cloud-based system can comprise another cloud-based system 112' implemented on a different processing platform 106' coupled to the network 104.

It is to be appreciated that the particular processing platform configuration illustrated in the FIG. 1 embodiment is presented by way of example only, and that other embodiments can utilize other arrangements of additional or alternative components. For example, functionality disclosed herein as being associated with two or more separate components can in other embodiments be combined into a single component.

A more particular example of an additional component that can be included in the processing platform 106 is a resource abstraction layer. Such a resource abstraction layer may be associated with the cloud-based system 112 and may comprise one or more resource abstraction frameworks such as a Mesos framework or a Cloud Foundry Diego framework. A given such framework can be configured to abstract away underlying virtual resources 110 from client applications that utilize those virtual resources.

As mentioned previously, the virtual resources 110 implemented by the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system 112.

The processing platform 106 can also incorporate one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates additional functionality, such as management and orchestration functionality. The management and orchestration functionality may be implemented, for example, in the cloud-based system 112 or components thereof, and can be provided, for example, using components such as VCE Vision™ Intelligent Operations Software, or other types of management and orchestration components, including components from Pivotal Cloud Foundry, or various combinations of multiple ones of these or other components.

In some embodiments, certain functionality of the cloud-based system 112 is made available to a user by a cloud service provider on a Software-as-a-Service (SaaS) basis. Such users may be associated with respective ones of the client devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 9 and 10. A given such processing platform comprises at least one processing device comprising a processor coupled to a memory, and the processing device may be implemented at least in part utilizing one or more virtual machines or other virtualization infrastructure. Additionally, the operation of the information processing system 100 will be described in further detail with reference to the flow diagram of FIG. 8.

Figure 2:
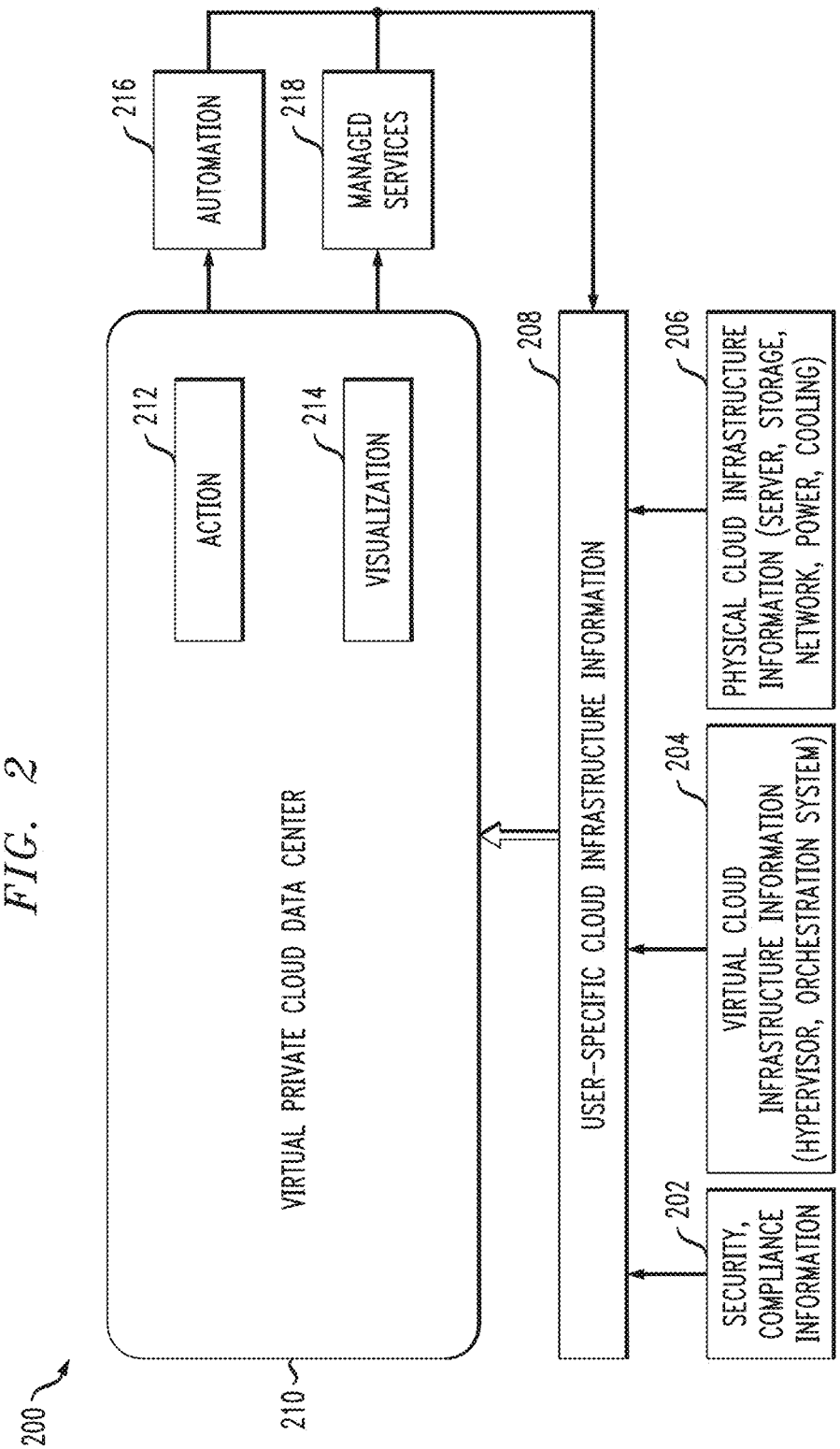
FIG. 2 shows another illustrative embodiment of an information processing system configured for three-dimensional visualization of a cloud-based system in an illustrative embodiment.

FIG. 2 shows another illustrative embodiment of an information processing system 200 configured for three-dimensional visualization of a cloud-based system in an illustrative embodiment. By way of illustration, information processing system 200 includes security and compliance information 202, virtual cloud infrastructure information 204 (such as hypervisor information, orchestration system information, etc.), and physical cloud infrastructure information 206 (such as server information, storage information, network information, power information, cooling information, etc.). Based on such information (that is, 202, 204 and 206), an example embodiment of the invention such as depicted in FIG. 2 can derive user-specific cloud infrastructure information 208. In one example embodiment, user-specific cloud infrastructure information 208 can be derived via use of hypervisor-provided APIs (such as, for example, an open source hypervisor kernel-based virtual machine (KVM) API). In another example embodiment, user-specific cloud infrastructure information 208 can be derived via plugging into one or more virtualization API generals such as, for example, libvirt.

As additionally depicted in FIG. 2, the derived user-specific cloud infrastructure information 208 is provided to a virtual private cloud data center 210, which includes an action component 212 and a visualization component 214. The action component 212 can include a representation of one or more standard actions, such as an information technology (IT) landscape manager/engineer/support person performs on an IT landscape. Such actions can include, for example, extending the storage of a virtual machine (VM), provisioning another virtual network, creating another virtual machine, etc.

Accordingly, in at least one embodiment of the invention, the action component 212 can represent the modification (create, change, retire, etc.) of an existing or new landscape.

In a virtual environment, such actions can be interactive and intuitive, such as, for example, grabbing a representation of a VM from a table and pushing the VM representation onto a virtual server in the room/space. In the background, the respective actions can be executed on the hypervisor to provision that VM on a server.

The visualization component 214 uses the user-specific cloud infrastructure information 208 to generate a three-dimensional representation of user-specific resources and interactions within one or more cloud-based systems (such as further detailed herein in connection with one or more embodiments of the invention).

The virtual private cloud data center 210 can subsequently be utilized and/or implemented by a user to carry out one or more automated tasks 216 as well as one or more managed services 218. Automated tasks can include tasks which can be executed, based on rules and/or settings, by the underlying platform (including a hypervisor) automatically without human interaction or intervention. Such tasks can include a storage extension (if a virtual machine runs out of memory), shutdown of a VM (if the VM is not used), spawning of a new machine based on load (for example, for a webserver if the load on a certain VM increases), etc. Managed services, on the other hand, provide support of the underlying IT system via human efforts. Such services can include, for example, a request by the end-user via a virtual reality (VR) environment to deploy a new system or component, which will require a human to execute tasks in the background.

Referring again to FIG. 2, automated tasks 216 and managed services 218 can additionally provide additional information to be used in generating and/or deriving user-specific cloud infrastructure information 208.

Figure 3:
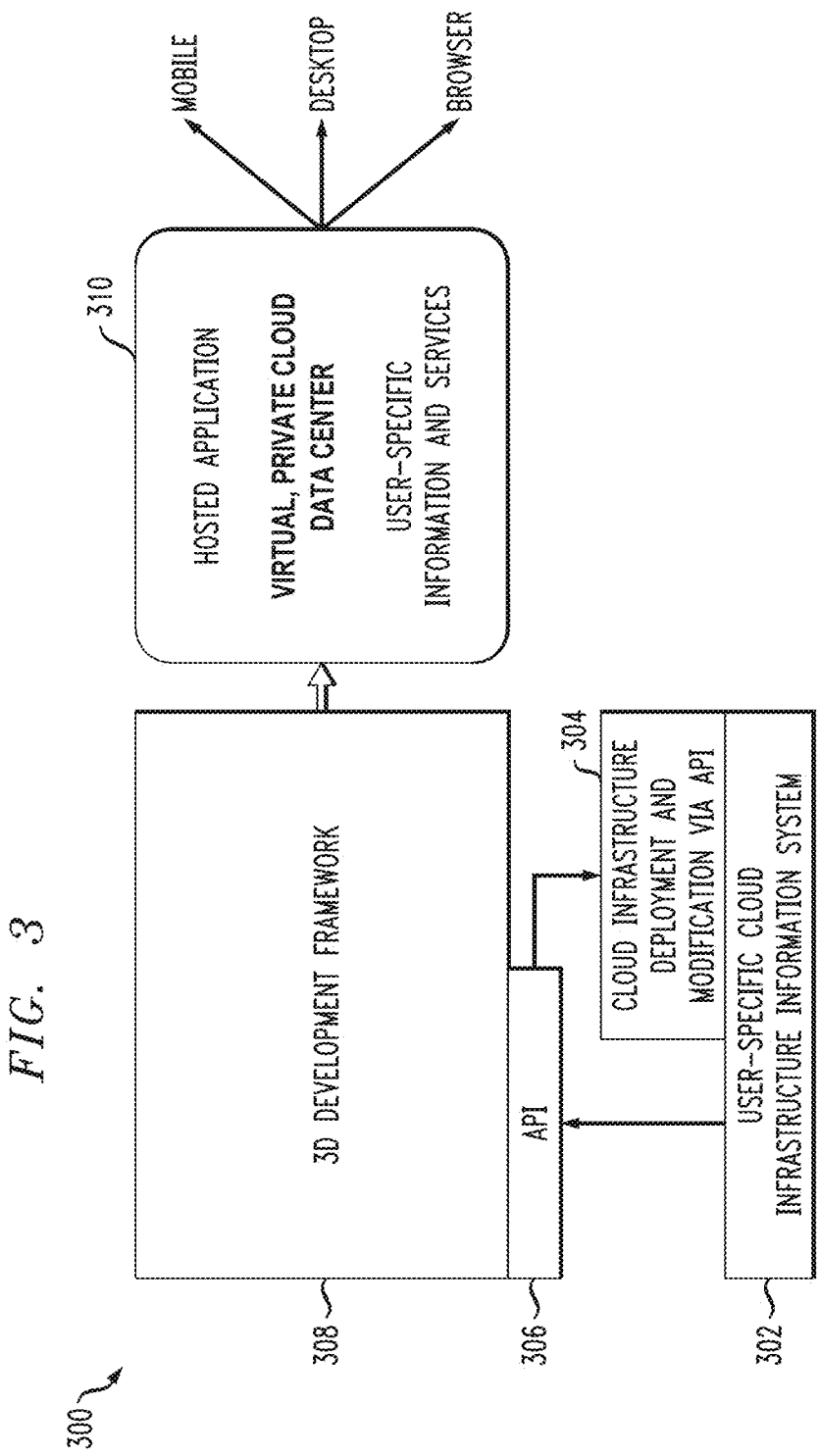
FIG. 3 shows yet another illustrative embodiment of an information processing system configured for three-dimensional visualization of a cloud-based system in an illustrative embodiment.

FIG. 3 shows another illustrative embodiment of an information processing system 300 configured for three-dimensional visualization of a cloud-based system in an illustrative embodiment. By way of illustration, information processing system 300 includes a user-specific cloud infrastructure information system 302, which can include an API 304 for cloud infrastructure deployment and modification. The user-specific cloud infrastructure information system 302 can include, for example, an IT system composed of virtual machines, a network, storage units, etc. As such, the API 304 can provide the means to modify the system 302.

Additionally, information processing system 300 includes a three-dimensional (3D) development framework 308, which includes a corresponding API 306. Based on information provided by user-specific cloud infrastructure information system 302 (via API 306, for example), the 3D development framework 308 generates a visualization of the product of cloud computing. Specifically, the 3D development framework can generate a representation of user-specific cloud infrastructure (such as, for example, computing components, memory components, network components, persistent storage components, etc.), such that the represented components follow their real-world (physical) look and feel within a data center model/framework. For example, machines can be sized in the generated 3D representation according to VM size, and elements can be color-coded in the representation based on their condition. By way merely of example, a small VM can be represented as a similarly small 3D box, and a low-response time of such a box (or an out of memory VM) can be represented as a red 3D box.

As also depicted in FIG. 3, the generated output 310 of the 3D development framework 308 can include and/or take the form of a hosted application and a virtual (private) cloud data center, which can further include user-specific information and services. Such an output 310 can be enabled and/or transmitted to a 3D browser, a mobile stand-alone, a desktop component, VR glasses and/or VR mobile solutions.

Referring now to FIG. 4, another illustrative embodiment is shown. In this embodiment, pseudocode 400 is executed by or under the control of a processing platform, such as processing platform 106, or another type of processing platform. For example, the pseudocode 400 may be viewed as comprising a portion of a software implementation of at least part of the virtual representation generator module 116 of the FIG. 1 embodiment.

The pseudocode 400 illustrates a process user interaction with a three-dimensional environment. Specifically, pseudocode 400 initiates a listener to end a user interaction for a virtual reality environment (via, for example, the pressing of a button on a keyboard, enacting a mouse-click, etc.) while the end user navigates through the environment. By way merely of illustration, pseudocode 400 can represent an example of how to deploy an action, such as action component 212 in FIG. 2.

It is to be appreciated that this particular pseudocode shows just one example implementation of a process for user interaction with a three-dimensional environment, and alternative implementations of the process can be used in other embodiments.

Referring now to FIG. 5, yet another illustrative embodiment is shown. In this embodiment, pseudocode 500 is executed by or under the control of a processing platform, such as processing platform 106, or another type of processing platform. For example, the pseudocode 400 may be viewed as comprising a portion of a software implementation of at least part of the virtual representation generator module 116 of the FIG. 1 embodiment.

The pseudocode 500 illustrates a process for creating a server object as part of a three-dimensional cloud environment visualization. Specifically, pseudocode 500 would deploy five virtual environment representations (serverobject) of virtual machines. As used in the example of pseudocode 500, the number 5 is merely illustrative, and can ultimately vary between landscapes. By way of further illustration, a serverobject can be visualized, in one or more embodiments of the invention, to appear like the servers depicted in screenshot 700 of FIG. 7A (that is, the servers depicted in the top-right window of the four virtual data center view windows).

It is to be appreciated that this particular pseudocode shows just one example implementation of a process for creating a server object as part of a three-dimensional cloud environment visualization, and alternative implementations of the process can be used in other embodiments.

Additionally, in FIG. 6, another illustrative embodiment is shown. In this embodiment, pseudocode 600 is executed by or under the control of a processing platform, such as processing platform 106, or another type of processing platform. For example, the pseudocode 400 may be viewed as comprising a portion of a software implementation of at least part of the virtual representation generator module 116 of the FIG. 1 embodiment.

The pseudocode 600 illustrates a process for updating a three-dimensional server based on hypervisor API input. Specifically, pseudocode 600 will change the color of serverobject "3dvirtualserver" based on input that is provided by the hypervisor API. The event on the hypervisor level to turn the "3dvirtualserver" red, in the example illustrated in connection with pseudocode 600, is "out of memory." By way of further example, pseudocode 600 can serve as a visual update of the virtual reality environment based on an IT landscape status (such as detailed in a system component such as system 302 in FIG. 3).

It is to be appreciated that this particular pseudocode shows just one example implementation of a process for updating a three-dimensional server based on hypervisor API input, and alternative implementations of the process can be used in other embodiments.

Figure 7A:
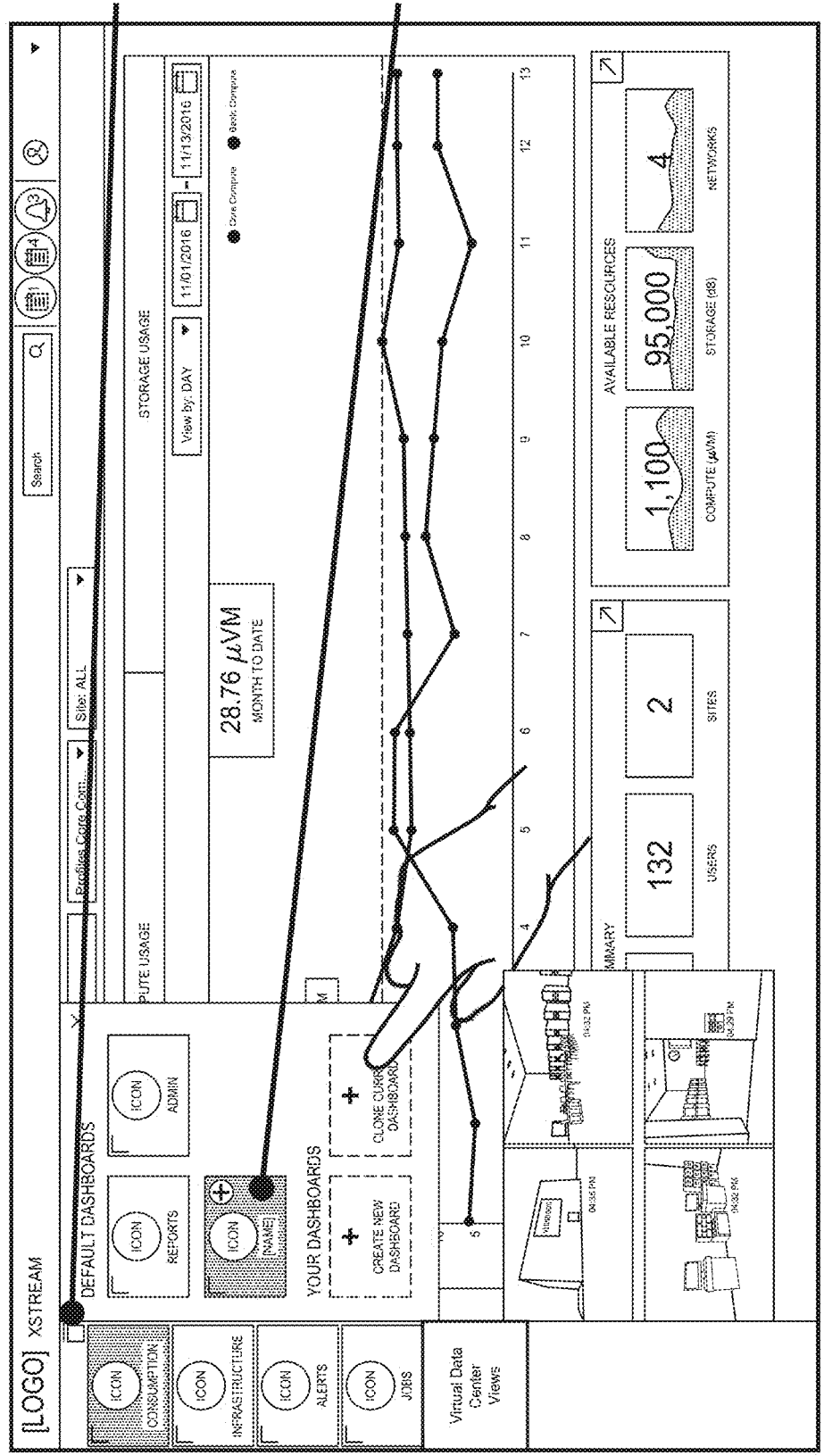
FIGS. 7A through 7B show examples of user interface (UI) frameworks in another illustrative embodiment. These figures are collectively referred to herein as FIG. 7.
Figure 7B:
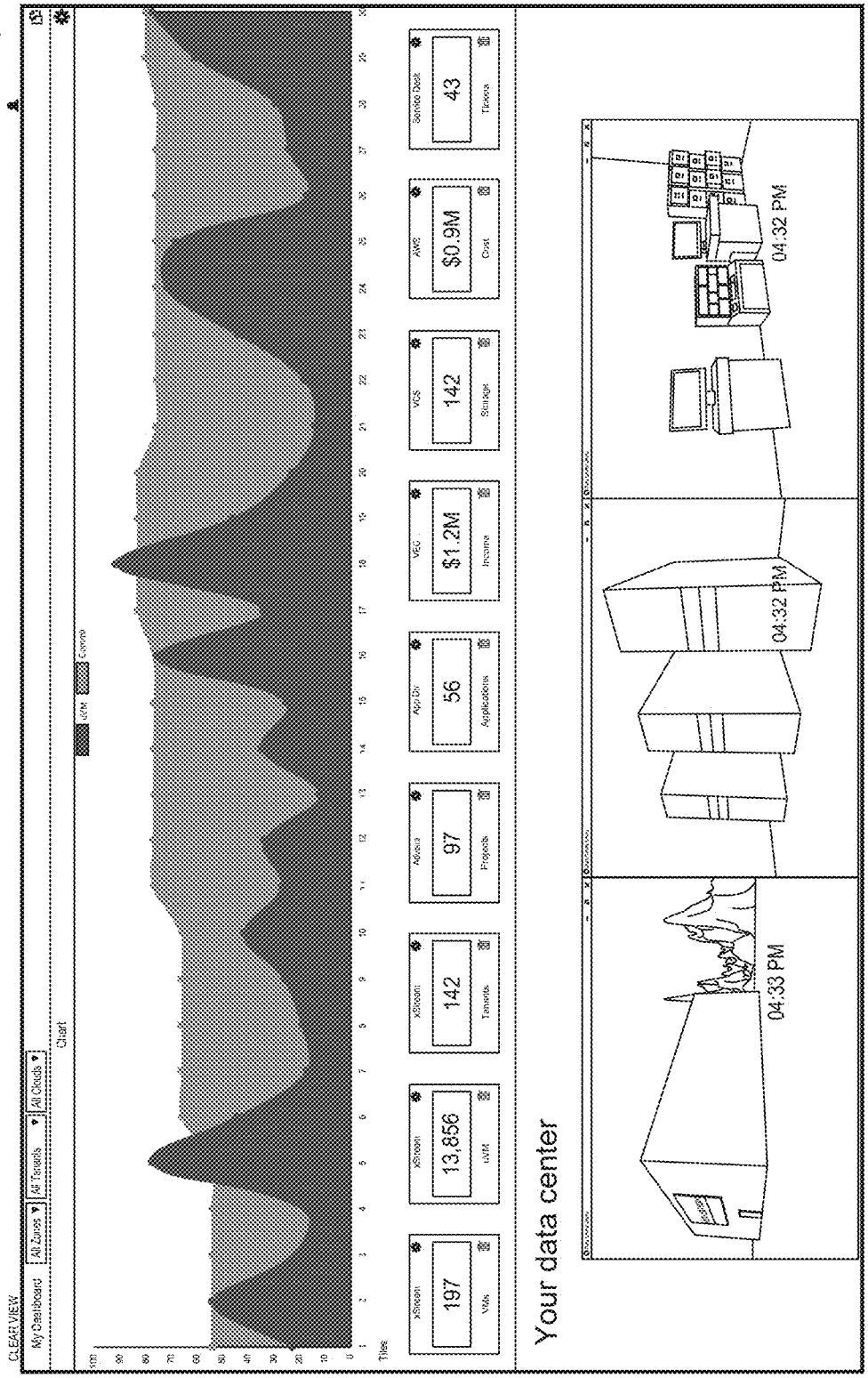

FIGS. 7A through 7B show examples of user interface frameworks in another illustrative embodiment. These figures are collectively referred to herein as FIG. 7. By way of illustration, FIG. 7 depicts screenshots 700 and 702 of example implementations of one or more embodiments of the invention. Specifically, in FIG. 7A, screenshot 700 depicts an example embodiment implementation in a UI framework for user interaction, which includes virtual data center views into the dashboard. Screenshot 700 of the example UI includes tile based dashboard components, which can be composed individually by the end-user for the specific end-user experience. Additionally, the graph in screenshot 700 shows resource usage, and the numbers depicted along the bottom row of the screenshot 700 show currently available resources as provisioning for the user. The virtual data center views, in the lower-left corner of screenshot 700, extend the end-user experience with a virtual "view" into the landscape, allowing the end-user to go beyond the graphs and numbers via a visualization.

Additionally, in FIG. 7B, screenshot 702 also depicts virtual data center views within an example embodiment implementation in a UI framework. Specifically, the graph in the top half of screenshot 702 represents resource usage over time, while the boxed numbers (below the graph) show the current resource consumption.

As noted herein, the operation of the information processing system 100 is described in further detail with reference to the flow diagram of the example embodiment of FIG. 8. The process as shown includes steps 800 through 808, and is suitable for use in the system 100 but is more generally applicable to other systems comprising a processing platform having cloud infrastructure representation functionality. Accordingly, references to components of the embodiment of FIG. 1 in the process description below should not be viewed as limiting in any way, as the disclosed process steps can be applied in a wide variety of other types of information processing systems.

In step 800, at least one processing platform is configured to include a plurality of processing devices each comprising a processor coupled to a memory. In the context of the FIG. 1 embodiment, information processing system 100 comprises multiple processing platforms 106 and 106' as illustrated in the figure. The one or more additional processing platforms 106' may be configured in substantially the same manner as the processing platform 106. Each such processing platform comprises virtual resources for use by client applications.

In step 802, virtual resources of at least a first cloud-based system are implemented within the processing platform. For example, with reference to the FIG. 1 embodiment, virtual resources 110 of cloud-based system 112 are implemented within the processing platform 106. As mentioned previously, such virtual resources illustratively comprise containers, virtual machines or combinations thereof. For example, in the context of the FIG. 1 embodiment, the virtual resources may comprise a plurality of containers allocable to respective client applications of the client devices 102 under the control of the cloud-based system 112. As another example, the virtual resources may comprise a plurality of virtual machines allocable to respective ones of the client applications of the client devices 102 under the control of the cloud-based system 112. Numerous other arrangements of virtual resources of various types and combinations can be utilized in other embodiments. For example, the virtual resources can include a plurality of virtual machines and a plurality of containers configured to run on at least a subset of the virtual machines.

In step 804, user-specific cloud infrastructure within the first cloud-based system is determined. Such a step can be carried out, for example, by user-specific cloud infrastructure identification module 114 in the FIG. 1 embodiment. The user-specific cloud infrastructure (also referred to herein as landscape information) can include user-specific virtual infrastructure such as, for example, at least one hypervisor and/or at least one orchestration system. Also, the user-specific cloud infrastructure can include user-specific physical infrastructure such as, for example, at least one server, at least one storage component, at least one power source, and/or at least cooling component. Additionally, determining the user-specific cloud infrastructure can include determining information pertaining to one or more interactions between multiple items of the user-specific cloud infrastructure within the first cloud-based system.

In step 806, an interactive three-dimensional visualization of the first cloud-based system is generated based on the user-specific cloud infrastructure. Such a step can be carried out, for example, by virtual representation generator module 116 in the FIG. 1 embodiment. In at least one embodiment of the invention, the interactive three-dimensional visualization is based on a data center visualization model. Additionally, generating the interactive three-dimensional visualization can include enabling interaction with the user-specific cloud infrastructure via at least one avatar. Further, enabling interaction via at least one avatar can include enabling consumption of information within the interactive three-dimensional visualization of the first cloud-based system via the at least one avatar, and/or enabling triggering of one or more actions within the interactive three-dimensional visualization of the first cloud-based system via the at least one avatar. In such an embodiment, the one or more actions can include deploying at least one item of cloud infrastructure, copying at least one item of cloud infrastructure, parking at least one item of cloud infrastructure, and/or deleting at least one item of cloud infrastructure.

In step 808, the interactive three-dimensional visualization of the first cloud-based system is output via at least one type of interface. Such a step can be carried out, for example, by virtual representation display module 118 in the FIG. 1 embodiment. The at least one type of interface can include a three-dimensional web browser, a mobile stand-alone interface, virtual reality glasses, and/or one or more virtual reality mobile solutions.

Figure 8:
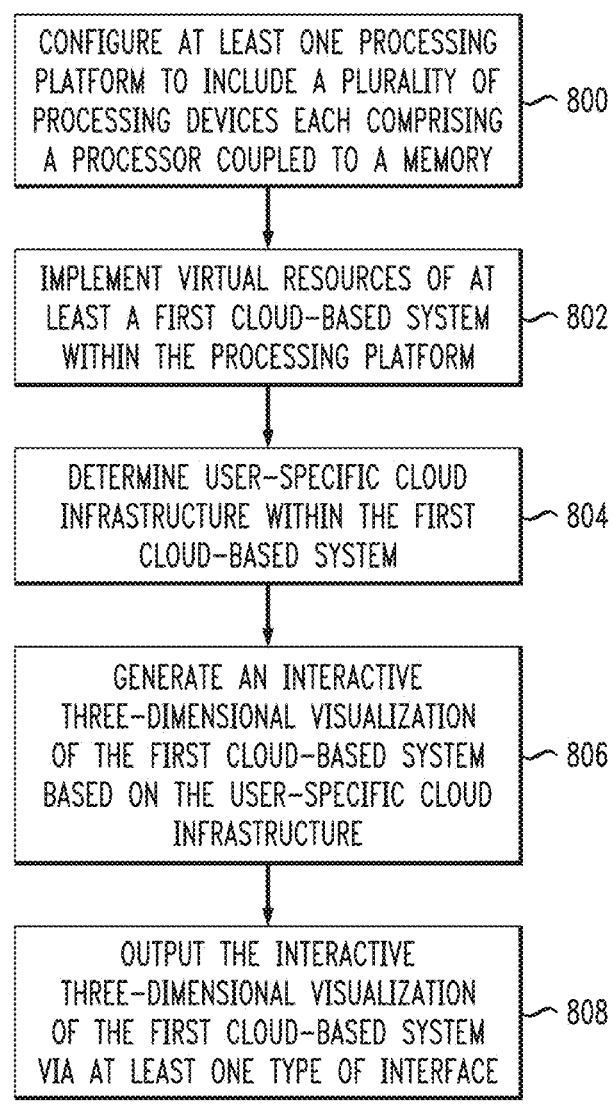
FIG. 8 is a flow diagram of a process for generating a three-dimensional visualization of a cloud-based system in an illustrative embodiment.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations involving cloud infrastructure representation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to carry out the techniques of one or more embodiments of the invention detailed herein.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of generating virtual representations of user-specific resources and interactions within cloud-based systems as disclosed herein can provide a number of significant advantages relative to conventional arrangements.

For example, some embodiments can advantageously provide interactive visualization of user-specific cloud infrastructure, greatly improving the user experience. Also, one or more embodiments can provide visualization of shortcomings of an existing landscape as well as one or more potential improvements. Additionally, some embodiments can enable self-service and managed service triggers and simulations, as well as conversion into deployed solutions. Further, one or more embodiments can provide troubleshooting, ticketing and service interaction by enabling customer interaction via an avatar (along with video, audio and/or chat functionality options).

Also, with respect to user engagement, one or more embodiments of the invention can include visualizing cloud resources, detailing one or more isolation issues, detailing connectivity to other data centers, and/or facilitating an ad hoc change of setup. Additionally, some embodiments can include onboarding processes, for example, by showing progress during a build, and displaying a virtual version of a user landscape in real-time. Further, with respect to operations, one or more embodiments of the invention can include providing a live view into a user's cloud infrastructure for the user and/or support teams, detecting problems and generating alerts via color coded elements, and enabling virtual interaction for user changes (add resources, remove resources, change resources, etc.). Support functionality can also be improved via implementation of one or more embodiments of the invention by, for example, augmenting the generated virtual data center with ticket information and status reports, as well as by creating a single point of entry for users.

More particularly, such embodiments can be configured to generate virtual representations of user-specific resources and interactions within cloud-based systems atomically in a data center format, thereby allowing users to visualize cloud infrastructure capabilities and any existing shortcomings related thereto.

Such arrangements overcome the difficulties that would otherwise be associated with visualizations limited to lists and tables.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
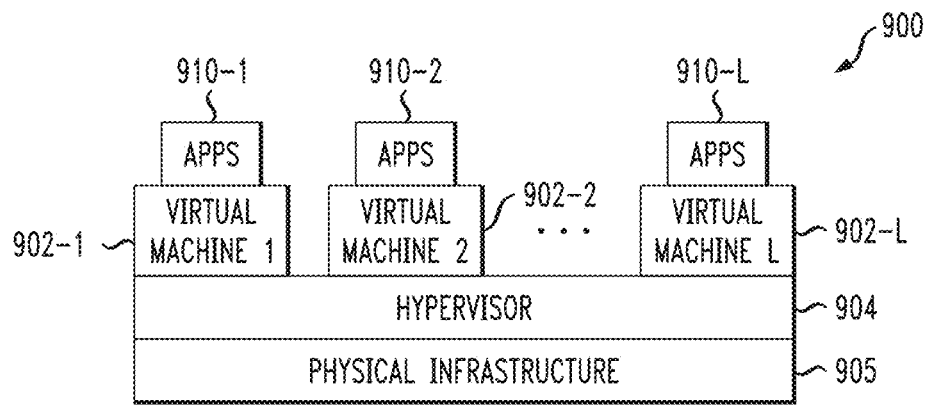
FIGS. 9 and 10 show examples of processing platforms that may be utilized to implement at least a portion of an information processing system in illustrative embodiments.
Figure 10:
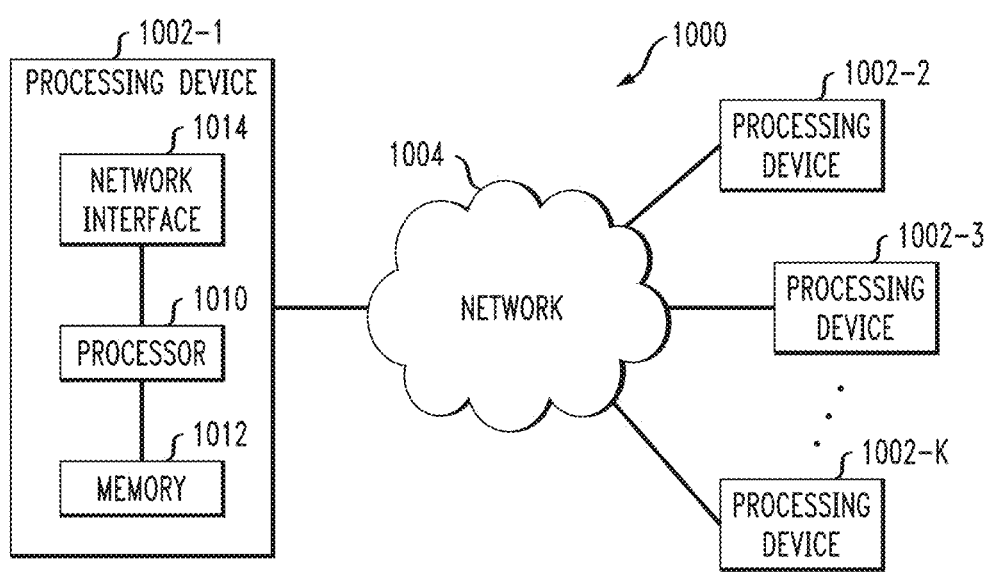

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises VMs 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

Although only a single hypervisor 904 is shown in the embodiment of FIG. 9, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 904 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments are presented for purposes of illustration only. Many variations and other alternative embodiments may be used. For example, the disclosed techniques are applicable to a wide variety of other types of information processing systems in which it is desirable to provide accurate and improved cloud infrastructure representation and visualization. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one processing platform comprising a plurality of processing devices each comprising a processor coupled to a memory;
the processing platform being configured:
to implement virtual resources of at least one cloud-based system;
to determine user-specific cloud infrastructure within the at least one cloud-based system, wherein the user-specific cloud infrastructure comprises user-specific physical infrastructure and user-specific virtual infrastructure, wherein the user-specific virtual infrastructure comprises at least one hypervisor and at least one orchestration system;
to generate an interactive three-dimensional visualization of the at least one cloud-based system based at least in part on the user-specific cloud infrastructure, wherein generating the interactive three-dimensional visualization comprises:
representing multiple components of the at least one cloud-based system within the interactive three-dimensional visualization in accordance with a physical data center framework, wherein the multiple components comprise multiple virtual machines, and wherein said representing comprises representing each of the multiple virtual machines as a machine sized in the interactive three-dimensional visualization according to a memory size allocation parameter, and color-coding each of the multiple machines in the interactive three-dimensional visualization based on (i) an amount of available memory attributed to each respective one of the multiple virtual machines and (ii) response time data associated with each respective one of the multiple virtual machines;
displaying at least one avatar within the interactive three-dimensional visualization; and
enabling interaction with the user-specific cloud infrastructure via user manipulation of the at least one avatar, wherein enabling interaction with the user-specific cloud infrastructure comprises enabling triggering of the following actions within the interactive three-dimensional visualization of the at least one cloud-based system via user manipulation of the at least one avatar, and wherein the actions comprise deploying at least one item of cloud infrastructure, copying at least one item of cloud infrastructure, deleting at least one item of cloud infrastructure, provisioning at least one item of cloud infrastructure, and extending storage capacity of at least one of the multiple virtual machines; and
to output the interactive three-dimensional visualization of the at least one cloud-based system via at least one type of interface.

2. The apparatus of claim 1, wherein the user-specific physical infrastructure comprises at least one server, at least one storage component, at least one power source, and at least one cooling component.

3. The apparatus of claim 1, wherein determining the user-specific cloud infrastructure comprises determining information pertaining to one or more interactions between multiple items of the user-specific cloud infrastructure within the at least one cloud-based system.

4. The apparatus of claim 1, wherein enabling interaction with the user-specific cloud infrastructure via user manipulation of the at least one avatar comprises enabling consumption of information within the interactive three-dimensional visualization of the at least one cloud-based system via user manipulation of the at least one avatar.

5. The apparatus of claim 1, wherein the at least one type of interface comprises at least one of a three-dimensional web browser, a mobile stand-alone interface, virtual reality glasses, and one or more virtual reality mobile solutions.

6. The apparatus of claim 1, wherein the virtual resources comprises at least one of a plurality of virtual machines and a plurality of containers configured to run on at least a subset of the virtual machines.

7. An information processing system comprising the apparatus of claim 1.

8. A method comprising:
    determining user-specific cloud infrastructure within at least one cloud-based system, wherein the user-specific cloud infrastructure comprises user-specific physical infrastructure and user-specific virtual infrastructure, wherein the user-specific virtual infrastructure comprises at least one hypervisor and at least one orchestration system;
    generating an interactive three-dimensional visualization of the at least one cloud-based system based at least in part on the user-specific cloud infrastructure, wherein generating the interactive three-dimensional visualization comprises:
        representing multiple components of the at least one cloud-based system within the interactive three-dimensional visualization in accordance with a physical data center framework, wherein the multiple components comprise multiple virtual machines, and wherein said representing comprises representing each of the multiple virtual machines as a machine sized in the interactive three-dimensional visualization according to a memory size allocation parameter, and color-coding each of the multiple machines in the interactive three-dimensional visualization based on (i) an amount of available memory attributed to each respective one of the multiple virtual machines and (ii) response time data associated with each respective one of the multiple virtual machines;
        displaying at least one avatar within the interactive three-dimensional visualization; and
        enabling interaction with the user-specific cloud infrastructure via user manipulation of the at least one avatar, wherein enabling interaction with the user-specific cloud infrastructure comprises enabling triggering of the following actions within the interactive three-dimensional visualization of the at least one cloud-based system via user manipulation of the at least one avatar, and wherein the actions comprise deploying at least one item of cloud infrastructure, copying at least one item of cloud infrastructure, deleting at least one item of cloud infrastructure, provisioning at least one item of cloud infrastructure, and extending storage capacity of at least one of the multiple virtual machines; and
    outputting the interactive three-dimensional visualization of the at least one cloud-based system via at least one type of interface;
    wherein the determining, generating, and outputting are implemented in at least one processing platform configured to include a plurality of processing devices each comprising a processor coupled to a memory; and
    wherein the processing platform is configured to implement virtual resources of at least the at least one cloud-based system.

9. The method of claim 8, wherein determining the user-specific cloud infrastructure comprises determining information pertaining to one or more interactions between multiple items of the user-specific cloud infrastructure within the at least one cloud-based system.

10. The method of claim 8, wherein enabling interaction with the user-specific cloud infrastructure via user manipulation of the at least one avatar comprises enabling consumption of information within the interactive three-dimensional visualization of the at least one cloud-based system via user manipulation of the at least one avatar.

11. The method of claim 8, wherein the at least one type of interface comprises at least one of a three-dimensional web browser, a mobile stand-alone interface, virtual reality glasses, and one or more virtual reality mobile solutions.

12. The method of claim 8, wherein the user-specific physical infrastructure comprises at least one server, at least one storage component, at least one power source, and at least one cooling component.

13. The method of claim 8, wherein the virtual resources comprises a plurality of virtual machines.

14. The method of claim 13, wherein the virtual resources comprises a plurality of containers configured to run on at least a subset of the plurality of virtual machines.

15. A computer program product comprising a non-transitory processor-readable storage medium having stored therein program code of one or more software programs, wherein the program code when executed by a processing platform comprising a plurality of processing devices causes the processing platform:
    to determine user-specific cloud infrastructure within at least one cloud-based system, wherein the user-specific cloud infrastructure comprises user-specific physical infrastructure and user-specific virtual infrastructure, wherein the user-specific virtual infrastructure comprises at least one hypervisor and at least one orchestration system;
    to generate an interactive three-dimensional visualization of the at least one cloud-based system based at least in part on the user-specific cloud infrastructure, wherein generating the interactive three-dimensional visualization comprises:
        representing multiple components of the at least one cloud-based system within the interactive three-dimensional visualization in accordance with a physical data center framework, wherein the multiple components comprise multiple virtual machines, and wherein said representing comprises representing each of the multiple virtual machines as a machine sized in the interactive three-dimensional visualization according to a memory size allocation parameter, and color-coding each of the multiple machines in the interactive three-dimensional visualization based on (i) an amount of available memory attributed to each respective one of the multiple virtual machines and (ii) response time data associated with each respective one of the multiple virtual machines;
        displaying at least one avatar within the interactive three-dimensional visualization; and
        enabling interaction with the user-specific cloud infrastructure via user manipulation of the at least one avatar, wherein enabling interaction with the user-specific cloud infrastructure comprises enabling triggering of the following actions within the interactive three-dimensional visualization of the at least one cloud-based system via user manipulation of the at least one avatar, and wherein the actions comprise deploying at least one item of cloud infrastructure, copying at least one item of cloud infrastructure, deleting at least one item of cloud infrastructure, provisioning at least one item of cloud infrastructure, and extending storage capacity of at least one of the multiple virtual machines; and to output the interactive three-dimensional visualization of the at least one cloud-based system via at least one type of interface;

wherein the processing platform is configured to implement virtual resources of at least the at least one cloud-based system.

16. The computer program product of claim 15, wherein determining the user-specific cloud infrastructure comprises determining information pertaining to one or more interactions between multiple items of the user-specific cloud infrastructure within the at least one cloud-based system.

17. The computer program product of claim 15, wherein enabling interaction with the user-specific cloud infrastructure via the at least one avatar comprises enabling consumption of information within the interactive three-dimensional visualization of the at least one cloud-based system via the at least one avatar.

18. The computer program product of claim 15, wherein the user-specific physical infrastructure comprises at least one server, at least one storage component, at least one power source, and at least one cooling component.

19. The computer program product of claim 15, wherein the virtual resources comprises at least one of a plurality of virtual machines and a plurality of containers configured to run on at least a subset of the virtual machines.

20. The computer program product of claim 15, wherein the at least one type of interface comprises at least one of a three-dimensional web browser, a mobile stand-alone interface, virtual reality glasses, and one or more virtual reality mobile solutions.

* * * * *